United States Patent [19]

Dee et al.

[11] Patent Number: 5,530,049
[45] Date of Patent: Jun. 25, 1996

[54] SOLUTIONS OF PERFLUORINATED POLYMERS IN $CO_2$

[75] Inventors: Gregory T. Dee, Wilmington; William H. Tuminello, Newark, both of Del.

[73] Assignee: E. I. Du Pont de Nemours and Company, Wilmington, Del.

[21] Appl. No.: 528,874

[22] Filed: Sep. 15, 1995

Related U.S. Application Data

[63] Continuation of Ser. No. 390,144, Feb. 17, 1995, abandoned, which is a continuation of Ser. No. 145,366, Oct. 29, 1993, abandoned.

[51] Int. Cl.⁶ .............................. C08J 3/02; C08K 3/00; C08L 23/04
[52] U.S. Cl. .............. 524/424; 524/546; 528/481; 528/482; 528/483; 528/490; 528/503
[58] Field of Search ........................ 524/401, 402, 524/424, 438; 528/481, 482, 483, 490, 503

[56] References Cited

FOREIGN PATENT DOCUMENTS

WO93/20116  10/1993  WIPO .................. C08F 14/18

OTHER PUBLICATIONS

J. M. DeSimone, et al., Synthesis of Fluoropolymers in Supercritical Carbon Dioxide, *Science*, 257, 945–947, 1992.

M. McHugh et al., Supercritical Fluid Extraction Principles and Practice, *Butterworths, Boston*, Chapter 9, pp. 156–163, 1986.

P. Smith, et al., Dissolution of Poly(Tetrafluoroethylene), *Macromolecules* 1993, 1222–1227.

McHugh, M. et al, *Encyclopedia of Polymer Science & Engineering*, 16, 368–399 (1985).

JP 50–49806(Abstract), 'Derwent Publications Ltd., London, AN–93–111979[14], Mar. 2, 1993.

JP 50–49806 (Abstract), *Patent Abstracts of Japan*, vol. 17, No. 355; Jul. 6, 1993.

Primary Examiner—Paul R. Michl
Assistant Examiner—U. K. Rajguru

[57] ABSTRACT

High melting point perfluorinated tetrafluoroethylene polymers dissolved in supercritical carbon dioxide at elevated temperatures and high pressures. The solutions are useful for making foams, spun-bonded or paper-like webs, or for purification of polymers.

17 Claims, 2 Drawing Sheets

SOLUTIONS OF PERFLUORINATED POLYMERS IN CO$_2$

This is a continuation of application Ser. No. 08/390,144 filed Feb. 17, 1995, now abandoned, which is a continuation of application Ser. No. 08/145,366 filed Oct. 29, 1993, now abandoned.

FIELD OF THE INVENTION

Disclosed herein are solutions of perfluorinated polymers, which contain tetrafluoroethylene repeat units, dissolved in supercritical carbon dioxide. Also disclosed is a process for making these solutions.

TECHNICAL BACKGROUND

It is well known that perfluorinated polymers, particularly such perfluorinated polymers which melt at higher temperatures, are difficult to dissolve in solvents, and solvents for such perfluorinated polymers are typically perhalogenated, often perfluorinated, compounds. Such compounds are relatively expensive, sometimes toxic, and believed to be "greenhouse gases". Cheaper, more benign solvents are therefore desired. It has now been found that such perfluorinated polymers dissolve in supercritical CO$_2$ (carbon dioxide) under specified conditions, which depend on the melting point of the polymer.

J. M. DeSimone, et al., Science, vol. 257, p. 945–947 (1992) describes solutions of hydrofluorocarbon polymers in supercritical CO$_2$. Solutions of perfluoropolymers are not made.

In M. McHugh et al., Supercritical Fluid Extraction Principles and Practice, Butterworths, Boston, 1986, chapter 9, pages 156–163, it is reported that low molecular weight poly(hexafluoropropylene oxide) and low molecular weight poly(chlorotrifluoroethylene) dissolve in supercritical carbon dioxide. Both of these polymers are low molecular weight, and are oils (noncrystalline) at room temperature.

SUMMARY OF THE INVENTION

This invention concerns a composition comprising a perfluorinated tetrafluoroethylene polymer with a melting point of about 175° C. or more, dissolved in supercritical CO$_2$.

This invention also concerns a process for dissolution of perfluorinated tetrafluoroethylene polymer comprising, contacting a perfluorinated tetrafluoroethylene polymer with supercritical CO$_2$ at a temperature and a pressure sufficient to ensure complete miscibility of said perfluorinated tetrafluoroethylene polymer and said CO$_2$ at all proportions, provided that said perfluorinated tetrafluoroethylene polymer has a melting point of about 175° C. or more.

DETAILS OF THE INVENTION

In all the descriptions below, each preferred condition or composition is applicable to both the process of dissolving the polymer and the polymer solution itself, when appropriate.

The polymer used herein is a perfluorinated tetrafluoroethylene polymer. By this is meant that at least 50 mole percent, preferably at least 75 mole percent, of the repeat units in the polymer are derived from tetrafluoroethylene (TFE), i.e., —CF$_2$CF$_2$—. Thus the polymer is a homo- or copolymer of TFE. If the polymer is a copolymer, the comonomers of which it is composed are all perfluorinated. Preferred comonomers are perfluoro(propyl vinyl ether), hexafluoropropylene, and perfluoro(methyl vinyl ether). Hexafluoropropylene and perfluoro(propyl vinyl ether) are especially preferred comonomers. Another preferred polymer is the TFE homopolymer, polytetrafluoroethylene (PTFE).

The polymers used herein have a melting point of 175° C. or more, preferably 200° C. or more, and more preferably 250° C. or more. The melting point used herein is measured by differential scanning calorimetry (DSC) using ASTM method D3418–82, with the following exceptions. The heating rate is 10° C./min. About 10 mg of polymer, which has been quenched from the melt, is used. The melting point is measured by drawing a straight line from the baseline just at the onset of the melting endotherm, to the baseline just at the end of the melting endotherm. The melting point is taken as the point at which the straight line intersects with the experimental plot at the end of the melting endotherm. Thus, the melting point used herein corresponds to the temperature of the melting point of the highest melting fraction of the polymer, under the test conditions.

The polymers herein are dissolved in supercritical CO$_2$. The critical temperature of CO$_2$ is 31° C. but much higher temperatures, usually above 100° C., are needed. This is because the polymers have such high melting points, and because these melting points are pressure dependent. Thus as the pressure is raised, the melting points of the polymers increase. Therefore, the temperature required for dissolution will sometimes rise as the pressure on the system is increased, particularly when the amount of CO$_2$ in the mixture is relatively low. Generally, the pressure required to cause dissolution of the polymer is about 80 MPa or more, preferably about 90 MPa or more, and more preferably about 100 MPa or more.

Other lower boiling compounds such as SF$_6$, N$_2$O, N$_2$ and Ar may also act as solvents for the instant polymers under similar supercritical conditions.

By dissolution herein is meant dissolving the polymer under conditions in which the polymer and CO$_2$ are miscible in all proportions. While the dissolution may start under conditions that are not sufficient for complete dissolution, as in the early stages of heating and or pressurizing the apparatus used, the process should at least pass through conditions (temperature and pressure) under which the CO$_2$ and polymer are completely miscible in all proportions. It is most convenient to maintain the solution at such conditions, although the solution can also be maintained at any conditions under which that particular polymer at that particular concentration in CO$_2$ remains miscible.

The solutions made herein are useful for making foams (by lowering the pressure on the solution, preferably in a controlled manner), and spun-bonded or paper-like webs (see U.S. Pat. No. 4,052,625). Polymer may also be purified (separated from inorganic or other insoluble materials) by dissolution of the polymer and filtration of the solution (under conditions at which the polymer remains soluble).

It is preferred that the ingredients be agitated in some way while the polymer is dissolving. Agitation will increase the rate of the dissolution process. The rate at which the polymer dissolves also depends upon the concentration of polymer desired in the CO$_2$ solution, and the molecular weight of the polymer. The higher the concentration and/or the higher the polymer molecular weight, the slower the polymer will dissolve.

Included herein are FIGS. 1 and 2, which are phase diagrams for the instant perfluorinated tetrafluoroethylene polymers in supercritical $CO_2$, at 92 MPa and 100 MPa respectively. These calculated phase diagrams were determined in the following way. The Flory-Huggins Theory (see P. J. Flory, Principles of Polymer Chemistry, Cornell University Press, Ithaca, N.Y., 1953, p. 568) was used to predict the liquidus curve (melting point depression). For this calculation a minimum value of 0.34 for the polymer-solvent interaction parameter was used, when $CO_2$ molar volume was less than about 55 cm$^3$/mole.

The Sanchez and Lacombe equation-of-state theory [I. C. Sanchez, et al., J. Phys. Chem., vol. 80, p. 2352 (1976)] was used according to methodology outlined by Sanchez (see I. C. Sanchez in R. A. Meyers, Ed., Encyclopedia of Physical Science and Technology, vol. 11, p. 1–18, 1987). PVT data for PTFE [see P. Zoller, J. Appl. Polym. Sic., vol. 22, p. 633 (1978)] were used to obtain the appropriate reduction factors, which were used at all temperatures and for all the polymers. For PTFE itself, and for the other polymers whose phase diagrams are shown in FIGS. 1 and 2, PVT data for PTFE were used, since it was assumed that perfluorinated copolymers will have approximately the same atmospheric pressure density and PVT relationships as PTFE. All other data needed (such as that for $CO_2$) was obtained from the literature.

BRIEF DESCRIPTION OF THE DRAWINGS

All of these calculations were used to generate FIGS. 1 and 2. These Figures are phase diagrams, differing only in the fact that FIG. 1 is a diagram of the $C_2$-perfluorinated tetrafluoroethylene polymer system at a pressure of 92 MPa, while

Figure 1:
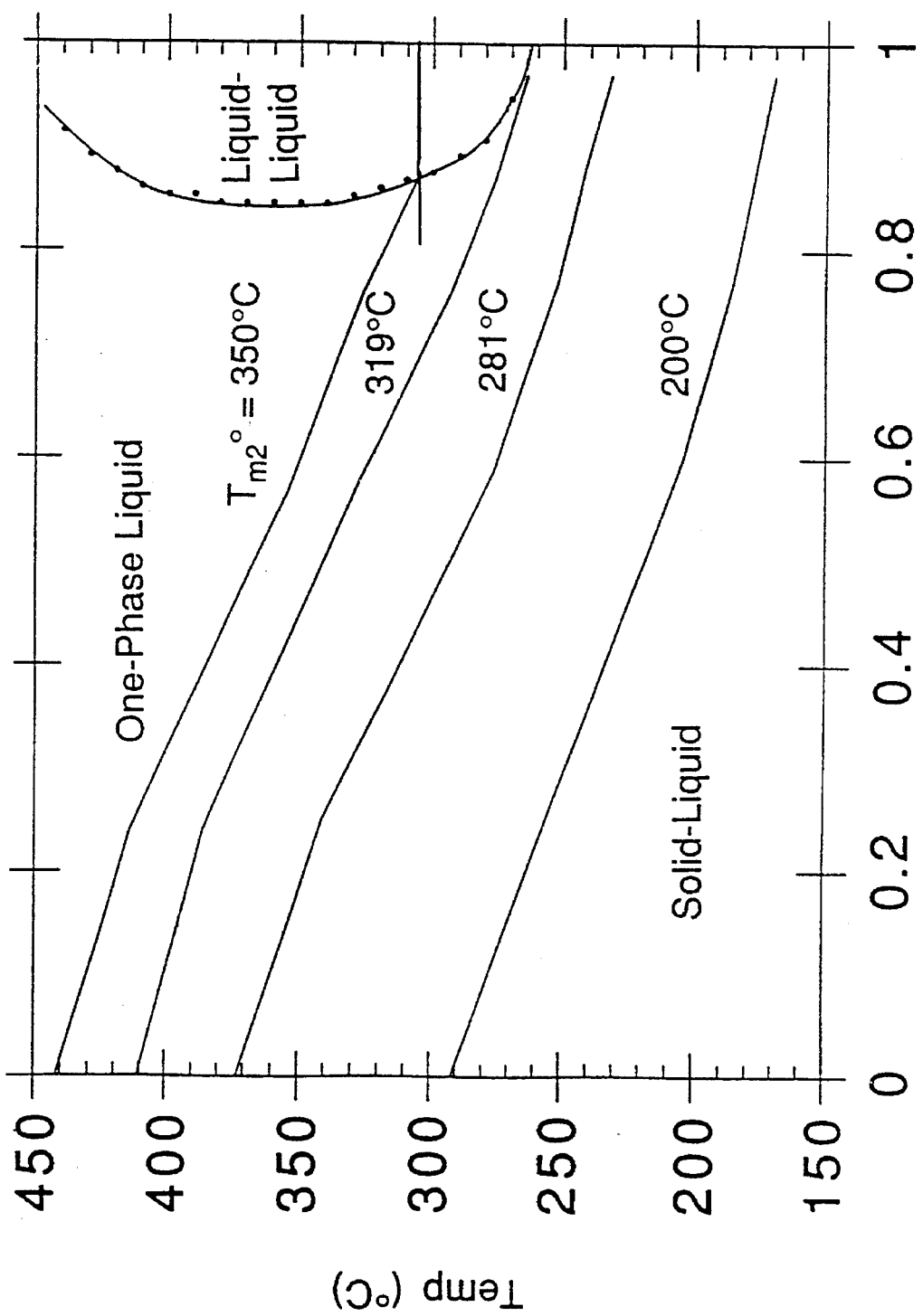
In FIG. 1, the circular area in which L—L appears represents conditions under which two liquid phases occur. In this circular area, and the area below the diagonal line for each polymer represent conditions in which each of the polymers is not totally miscible with $CO_2$ in all proportions.
Figure 2:
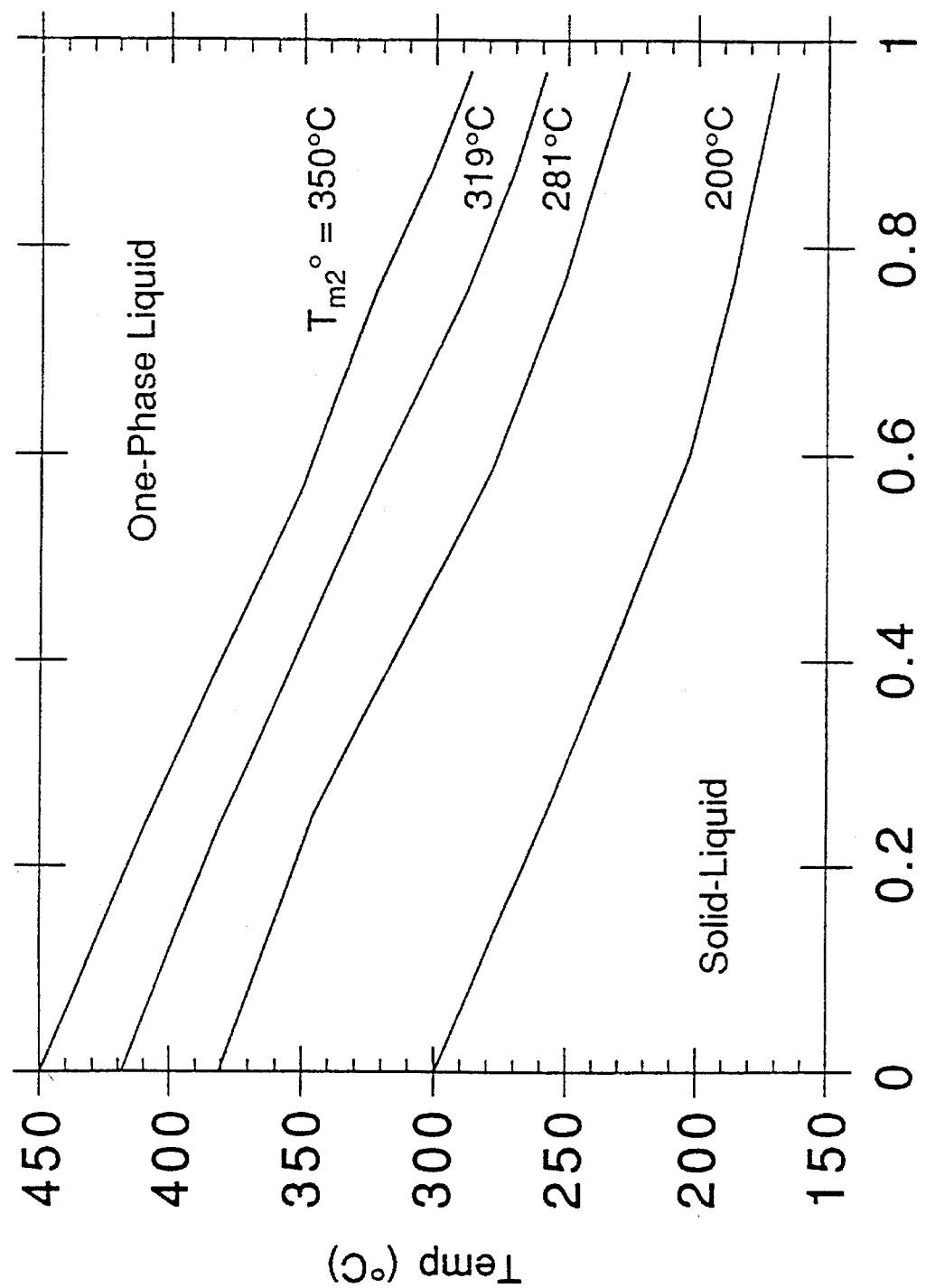
FIG. 2 is at 100 MPa. As noted, the horizontal axis represents the weight fraction of $CO_2$, while the vertical axis is temperature in °C. The four almost straight lines in each plot running approximately diagonally from upper left to lower right each represents a (co)polymer, either PTFE (top line) or the melting point of a copolymer (the lowest line of the four represents the polymer used in Examples 1 and 2). The area above each of these lines represents a single phase liquid (a solution) of $CO_2$ and that particular polymer, while the area below each line represent two phases, a solid (polymer) and liquid ($CO_2$ plus polymer).

The approximate combinations of temperature and pressure which are required for complete miscibility of a perfluorinated tetrafluoroethylene polymer at 92 MPa and 100 MPa are shown in these two Figures. These are approximations (because of the assumptions and approximations made in the calculations) of the conditions required for dissolving any particular polymer, and serve as a guide, so that very little experimentation is needed to determine the conditions of temperature and pressure needed to dissolve any particular polymer. Approximately correct conditions were predicted by these diagrams for the dissolution of the polymer of Examples 1 and 2.

General Procedure

A copolymer of tetrafluoroethylene containing 19.3 mole % hexafluoropropylene was used in the Examples because the apparatus could not be heated above 250° C. The shear viscosity for this polymer's melt at 372° C. was measured as 1200 Pa·s at a shear stress of 44,800 Pa. Its melting point by DSC (as previously described) was about 200° C.

The variable-volume cell and auxiliary equipment used in the dissolution studies is capable of holding 276 MPa (40,000 psi) pressure at 250° C. while enabling the viewing of solubility behavior. Agitation via a magnetic stirrer was used. The apparatus and its operation are described in Meilchen, et al., Macromolecules, volume 24, p. 4874 (1991). The apparatus was charged with polymer and $CO_2$ at room temperature. A band heater fitted around the piston-cell arrangement provided the main source of heat. All observations were made while the apparatus was heating from room temperature.

EXAMPLE 1

Copolymer (0.2 g) plus 15.98 grams of $CO_2$ was added to the apparatus described above. Near room temperature, the powdered polymer was quite visible as fluffy powder which quickly settled after agitation. The first evidence of any swelling was observed at about 125° C., 121 MPa, at which point the particles settled much more slowly. At 215° to 225° C., complete dissolution occurred with the exception of a small amount of cloudiness. An EPDM 'O' ring was used but failed near 225° C. allowing water into the cell.

EXAMPLE 2

Copolymer (1.022 g) was added with 17.034 grams of $CO_2$ to the apparatus described above. Near room temperature, the powdered polymer was quite visible as fluffy powder which quickly settled after agitation. The first evidence of any swelling was observed at about 146° C., 110 MPa, at which point the particles remained suspended in the liquid. Swelling and coalescence followed by elongation of the polymer-rich phase was observed when agitated at about 165° C., 110 MPa. These elongated strands of swollen polymer then appeared to dissolve into the more mobile $CO_2$-rich phase. Evidence that dissolution had actually occurred came in the form of observing a cloud point in the $CO_2$-rich phase upon dropping the pressure to about 90 MPa. This cloud point represents the pressure at which complete opacity was observed. The change from complete transparency to opacity occurred gradually over a broad pressure range from about 110 to 90 MPa. At about 215° C., a homogeneous, low viscosity, but slightly cloudy liquid was obtained. The cloud point was now about 131 MPa. The cloudiness could have been due to a small component of high TFE content homopolymer requiring higher temperatures for dissolution. It could also have been due to small amounts of insolubles leached from the 'O' ring seals. The Viton® 'O' rings used in this example swelled enormously in $CO_2$. Pressures and temperatures as high as 193 MPa and 225° C. were employed in an unsuccessful effort to render the liquid completely transparent.

The first observance of polymer dissolving in the $CO_2$ at 165° C. is quite close to our prediction of about 170° C. The point at which the solution got cloudy (formed two phases) at this temperature was observed to be about 90 MPa, also close to the predicted behavior. The broad range of temperature and pressure over which solubility was observed indicates a wide range in polymer composition.

We claim:

1. A composition comprising a perfluorinated tetrafluoroethylene polymer with a melting point of about 175° or more completely dissolved in $CO_2$, said perfluorinated tetrafluoroethylene polymer comprising at least 50 mole percent tetrafluoroethylene monomer units, and wherein essentially all comonomers, if any, are perfluorinated.

2. A composition according to claim 1 wherein the perfluorinated tetrafluoroethylene polymer is polytetrafluoroethylene.

3. A composition according to claim 1 wherein the perfluorinated tetrafluoroethylene polymer is a copolymer.

4. A composition according to claim 3 wherein one or more comonomers are selected from the group consisting of perfluoro(propyl vinyl ether), hexafluoropropylene, and perfluoro(methyl vinyl ether).

5. A composition according to claim 4 wherein one or more comonomers are selected from the group consisting of hexafluoropropylene and perfluoro(propyl vinyl ether).

6. A composition according to claim 1 wherein said melting point of the perfluorinated tetrafluoroethylene polymer is 200° C. or more.

7. A composition according to claim 6 wherein said melting point of the perfluorinated tetrafluoroethylene polymer is 250° C. or more.

8. A process for dissolution of perfluorinated tetrafluoroethylene polymer comprising, contacting a perfluorinated tetrafluoroethylene polymer with supercritical $CO_2$ at a temperature and pressure sufficient to ensure complete miscibility of said perfluorinated tetrafluoroethylene polymer and said $CO_2$ at all proportions, provided that said perfluorinated tetrafluoroethylene polymer has a melting point of about 175° or more, and said perfluorinated tetrafluoroethylene polymer comprises at least 50 mole percent tetrafluoroethylene monomer units, and wherein essentially all comonomers, if any, are perfluorinated.

9. A process according to claim 8 wherein said pressure is about 80 MPa or more.

10. A process according to claim 9 wherein said pressure is about 90 MPa or more.

11. A process according to claim 10 wherein said pressure is about 100 MPa or more.

12. A process according to claim 8 wherein said melting point of the perfluorinated tetrafluoroethylene polymer is 200° C. or more.

13. A process according to claim 12 wherein said melting point of the perfluorinated tetrafluoroethylene polymer is 250° C. or more.

14. A composition according to claim 8 wherein the perfluorinated tetrafluoroethylene polymer is polytetrafluoroethylene.

15. A composition according to claim 8 wherein the perfluorinated tetrafluoroethylene polymer is a copolymer.

16. A composition according to claim 15 wherein one or more comonomers are selected from the group consisting of perfluoro(propyl vinyl ether), hexafluoropropylene, and perfluoro(methyl vinyl ether).

17. A composition according to claim 16 wherein one or more comonomers are selected from the group consisting of hexafluoropropylene and perfluoro(propyl vinyl ether).

* * * * *